United States Patent [19]

Bingham

[11] Patent Number: 5,435,509
[45] Date of Patent: Jul. 25, 1995

[54] ANTENNA STAND

[75] Inventor: Grady A. Bingham, Eden, N.C.

[73] Assignee: Old Stone Corporation, Eden, N.C.

[21] Appl. No.: 205,063

[22] Filed: Mar. 3, 1994

Related U.S. Application Data

[63] Continuation of Ser. No. 913,388, Jul. 15, 1992, Pat. No. 5,308,029.

[51] Int. Cl.⁶ .................................. F16M 13/00
[52] U.S. Cl. ................................. 248/159; 248/170; 52/632
[58] Field of Search .............. 248/159, 157, 170, 171, 248/188.2, 161, 411; 343/875, 871, 881, 880, 883, 901; 52/632

[56] References Cited

U.S. PATENT DOCUMENTS

| | | | |
|---|---|---|---|
| 1,099,505 | 6/1914 | Llewellin | 248/171 |
| 1,517,825 | 12/1924 | Bruneau | 248/171 |
| 1,795,747 | 3/1931 | Viken | 248/171 X |
| 1,879,865 | 9/1932 | Wright | 248/157 |
| 1,900,354 | 3/1933 | Martin | 248/157 |
| 2,194,800 | 3/1940 | Ley | 248/171 X |
| 2,845,243 | 7/1958 | Mowers et al. | 248/170 X |
| 3,110,368 | 11/1963 | Ross | 52/632 X |
| 3,313,505 | 4/1967 | Petrie | 248/165 |
| 3,338,605 | 8/1967 | Stoeber | 248/159 X |
| 4,095,231 | 6/1978 | Carter . | |
| 4,625,937 | 12/1986 | Haase | 248/159 X |
| 5,308,029 | 5/1994 | Bingham | 248/159 |

FOREIGN PATENT DOCUMENTS

| | | | |
|---|---|---|---|
| 68984 | 6/1915 | Austria | 248/161 |
| 2527280 | 11/1983 | France | 52/632 |

Primary Examiner—Karen J. Chotkowski

[57] ABSTRACT

The invention herein pertains to an antenna stand for radio broadcasts and particularly pertains to temporary antenna stands which are erected for on site broadcasts such as at shopping centers or the like remote from a permanent broadcast station. A collapsible antenna stand having mast sections is provided so an individual worker can erect, dismantle or vary the height of the antenna with relative ease and convenience. The antenna mast comprises a series of sections which are engaged and slidably raised through the bottom of a tripod having extendable legs.

20 Claims, 2 Drawing Sheets

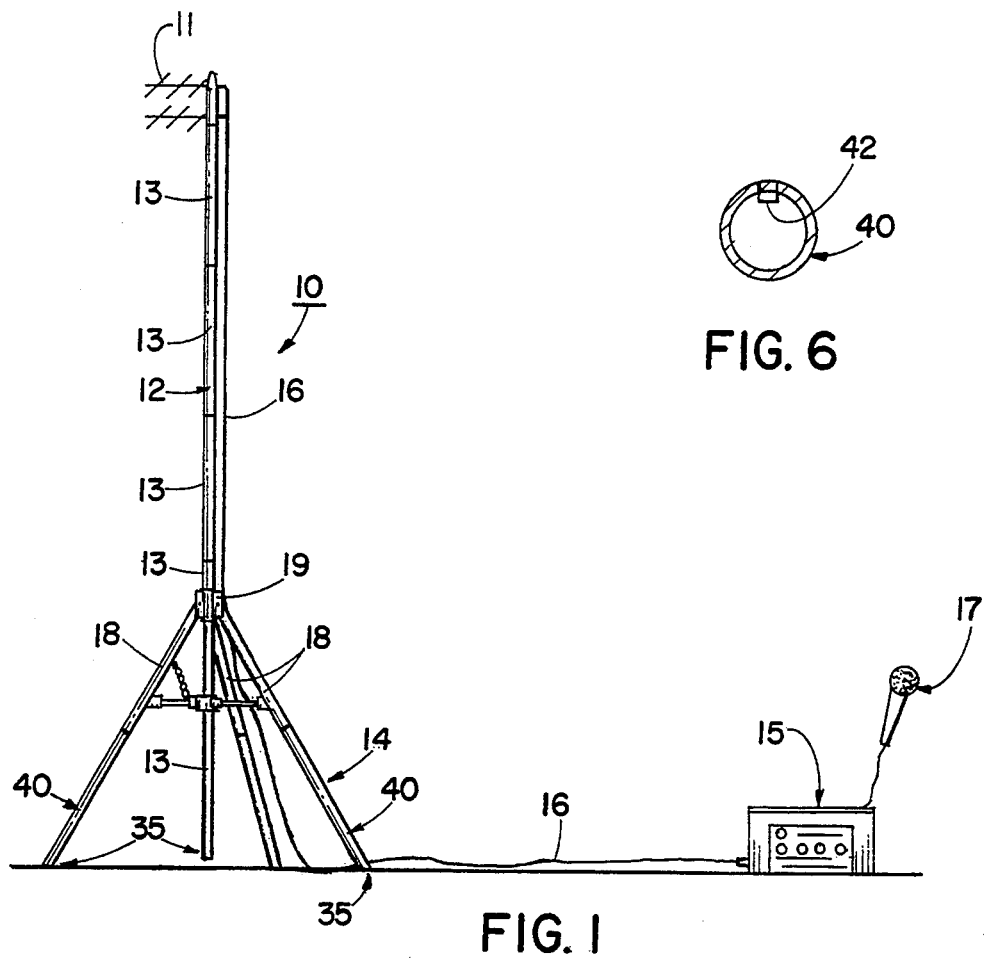
FIG. 6
FIG. 1
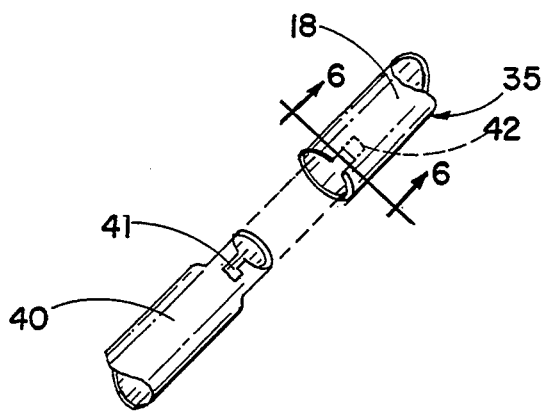
FIG. 5
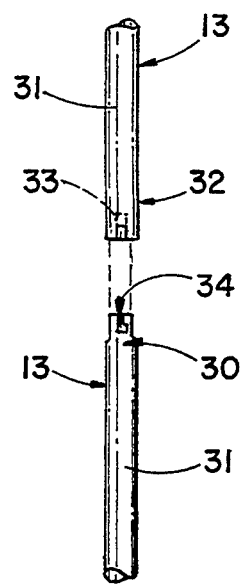
FIG. 4

ANTENNA STAND

This is a continuation of application Ser. No. 07/913.388, filed 15 Jul. 1992, now U.S. Pat. No. 5,308,029.

BACKGROUND OF THE INVENTION

1. Field of the Invention

The invention herein pertains to antennas for radio signal transmissions and particularly for temporary, short term use of antennas at remote locations which can be quickly assembled and dismantled by an individual.

2. Description of the Prior Art and Objectives of the Invention

In recent years automobile dealers and other retailers have utilized "on site" radio broadcasts for advertising purposes. Oftentimes, during short sales periods such as during one (1) day sale events, radio station announcers set up broadcast equipment in the particular store and encourage shoppers through the airwaves to participate in the promotions and sales that are taking place. In setting up for such on site broadcasts, equipment including a requisite antenna must be erected. Generally an FM signal is transmitted from the site to the station where the broadcast is then transmitted to the listeners in the area. The on site broadcast usually generates an FM signal of a relatively short range (twenty-five to thirty-five (25-35) miles) and is of the direct sight type, i.e., must not have obstacles in its path. Due to the cost of erecting a suitable, safe antenna, many retailers have heretofore been unable to satisfactorily utilize such on site broadcast. Also, in the past, antennas have been placed on building roofs and other permanent structures to obtain the height necessary which may be thirty to seventy-five (30-75) feet above ground level in most areas to provide a signal which will pass over neighboring buildings, trees and the like. Temporary antennas which have been used with success have required several persons to install and securely anchor them to insure the safety of passersby. Additionally, conventional antennas have not been easily height adjustable and usually cannot be easily varied for the particular location.

Thus, with the aforesaid and other problems of prior temporary antenna installations, the present invention was conceived and one of its objectives is to provide an antenna stand which will allow an antenna mast to be adjustably raised to the particular height desired.

It is still another objective of the present invention to provide an antenna stand for FM broadcast which can be easily and quickly erected and dismantled for storage and transportation by an individual worker.

It is still another objective of the present invention to provide an antenna stand which includes a relatively lightweight, collapsible tripod and mast which allows the antenna to be raised and lowered in convenient increments.

It is also an objective of the present invention to provide an antenna stand whereby the mast can be raised or lowered by sliding mast sections through the bottom of the tripod to obtain the height required.

Various other objectives and advantages of the present invention become apparent to those skilled in the art as a more detailed explanation is presented below.

SUMMARY OF THE INVENTION

The aforesaid and other objectives are realized by an antenna stand which can be used with a conventional FM radio signal antenna. The antenna stand comprises a tripod formed from tubular steel which can be collapsed for compact storage and transportation and which can be extended to receive antenna mast sections therethrough during erection. The antenna stand provides for convenient and easy set up by a single individual and due to its lightweight construction, can be transported and handled with ease. The antenna mast which supports the antenna consists of a plurality of sections which are joined end-to-end and locked in place. To raise the antenna a mast section is inserted through the bottom of the tripod into an existing mast section and the antenna mast is then manually urged upwardly. To disassemble the antenna, the antenna mast is disengaged, one (1) section from another, one (1) at a time through the bottom of the tripod and the tripod can then be collapsed and placed with the mast sections in a vehicle for transportation to another site.

BRIEF DESCRIPTION OF THE DRAWINGS

FIG. 1 shows the antenna stand of the invention with a typical radio broadcast equipment as would be used at an "on site" location;

FIG. 4 depicts portions of two (2) connectable mast sections prior to engagement;

FIG. 5 pictures a portion of the leg section and a portion of the leg extension prior to insertion; and FIG. 6 features a view of the tripod leg along lines 6—6 as shown in FIG. 5.

DESCRIPTION OF THE PREFERRED EMBODIMENT

Figure 2:
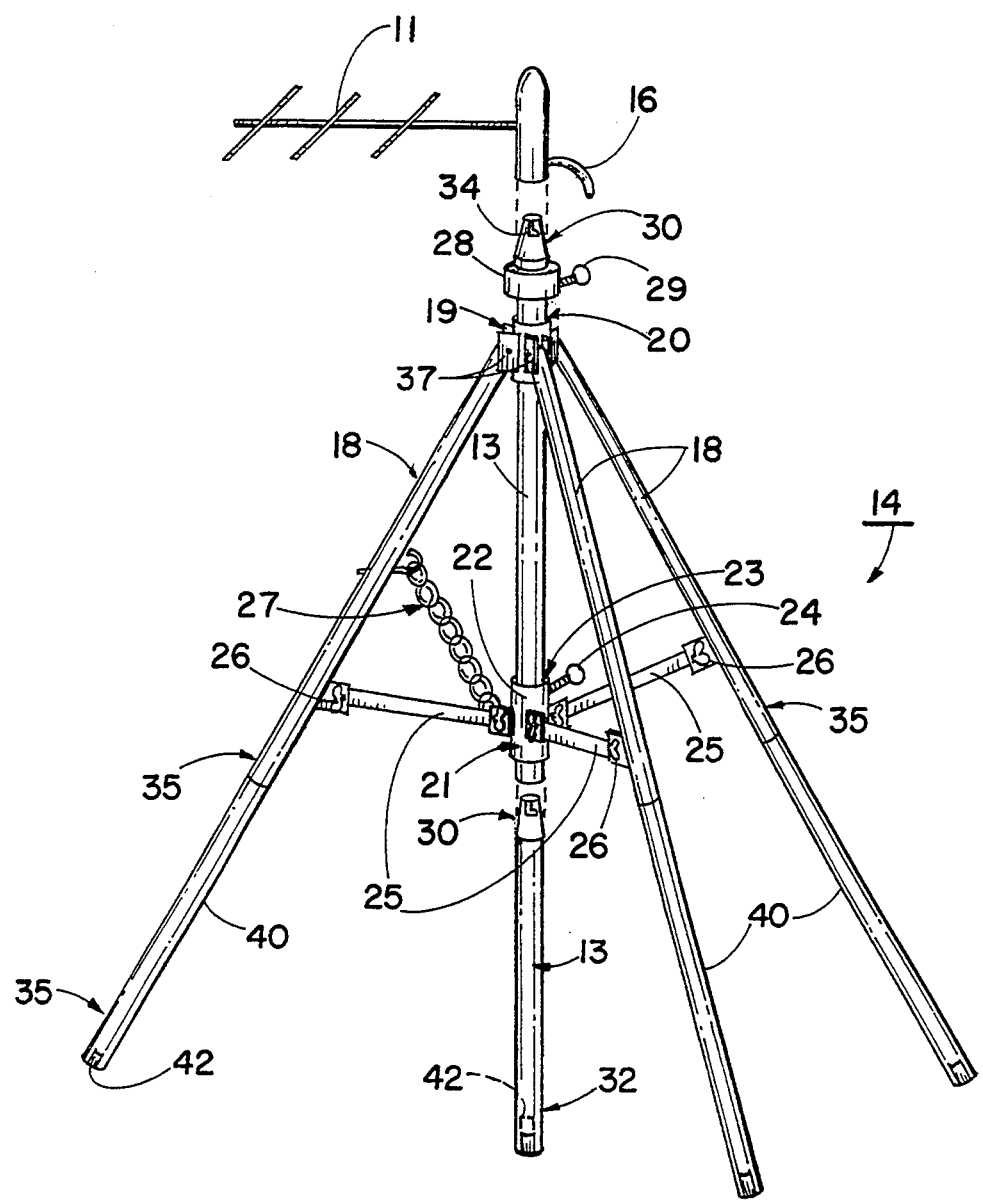
FIG. 2 demonstrates an enlarged view of the tripod of the invention with a single mast section therein.

The preferred form of the invention is shown in FIG. 2 whereby an antenna stand is shown with the tripod in an extended or open posture. The tripod is formed from steel with tubular legs which may be for example one and one-quarter inch (1¼) in outside diameter and may be five (5) feet in length. The height of the tripod can be raised to provide a broader base for the antenna mast by utilizing leg extensions. As shown in FIG. 2, only one (1) leg extension per leg has been utilized but more than one (1) extension can be engaged as shown in FIG. 5. The antenna mast as seen in FIG. 1 comprises a plurality of mast sections which, upon end-to-end engagement with other mast sections can be extended as desired. The mast sections are inserted through the center of the tripod specifically by inserting each mast section through the tripod brace assembly whereby the mast section is then passed through the upper mast guide. A locking thumb screw is provided on the brace for tightening against the mast section. The antenna shown in partial view in FIG. 2 is positioned atop the first mast section and is raised by inserting additional mast sections into engagement therewith from beneath the tripod brace assembly. The mast sections are formed from tubular steel as are the tripod legs and a sufficient number five (5) foot long mast sections to raise the antenna some fifty (50) feet can be easily set up and dismantled by a single individual in a matter of minutes.

DETAILED DESCRIPTION OF THE DRAWINGS AND OPERATION OF THE INVENTION

For a more complete understanding of the invention and its operation, turning now to the drawings, FIG. 1 demonstrates antenna stand 10 as may be used for example when broadcasting at a remote locations such as at a shopping center. As is familiar with those in radio broadcasting, oftentimes broadcasts originate remotely of the station and an antenna is required at the site to transmit an FM signal to the station receiver for amplification and broadcast to listeners on an assigned frequency. Such on site set ups require an antenna but heretofore, due to tall buildings or other natural or man-made obstacles nearby, the broadcast is difficult or impossible to perform on site. Previously, an antenna having a height of thirty (30) to forty (40) feet had to be positioned in advance of the broadcast and required a crane or several workers to anchor a relatively short antenna (up to fifty (50) feet) before broadcasting could begin. The additional labor and set up costs are expensive, and in fact could make the remote broadcast impractical. Automobile dealers, retail store owners and the like can profit from on site broadcasting during special promotions or sales of their products. However, the cost factor of the broadcast is critical and the antenna set up expense was one factor which had to be taken into account. The present invention solves the problems encountered with previous antennas in that antenna stand 10 as seen in FIG. 1 allows for a one (1) man crew to set the broadcast equipment up for operation and when the broadcast is complete, only one (1) crew member is required to dismantle the set up. As further shown in FIG. 1, antenna 11 is mounted atop antenna mast 12 which consists of a plurality of antenna mast sections 13 which are engaged end to end as illustrated in FIG. 4 and are mounted to tripod 14. Mast sections 13 are approximately five (5) feet long although longer or shorter sections could of course be used as desired. By making sections 13 five (5) feet in length, a convenient carrying length and weight is established which, due to the tubular steel construction of sections 13, allows single adult worker to easily carry six (6) or so sections 13 collapsed tripod 14 with ease. Antenna transmission line 16 as shown is connected to conventional broadcast equipment 15 which includes microphone 17. As would be understood, antenna stand 10 is positioned exteriorly of a department store or the like whereas equipment 15 can be positioned interiorly, out of the weather at a convenient site within a mall, store or building.

Figure 3:
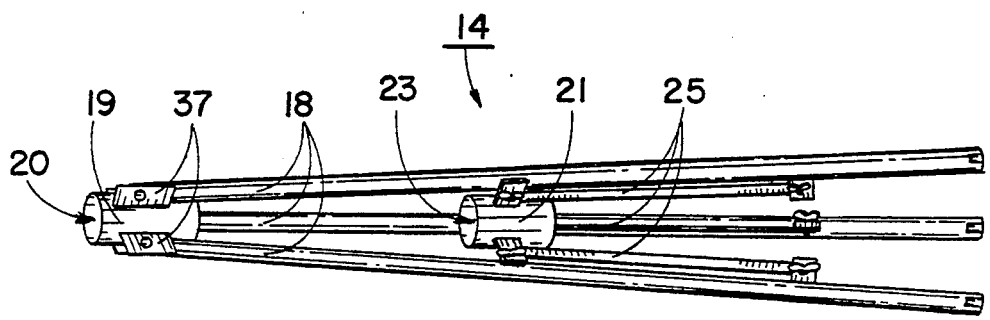
FIG. 3 illustrates the tripod in a collapsed posture as for storage and transportation purposes.

In FIG. 2, antenna tripod 14 is shown in more detail whereby a plurality of three (3) legs 18 are illustrated with one (1) of the legs partially shown for a better view. Legs 18 are equally spaced radially on mast guide 19 in pivotal fashion whereby legs 18 can collapse therearound as shown in FIG. 3 for storage purposes. As shown in FIG. 2, tripod legs 18 are hingedly joined to mast guide 19 as legs 18 are swingably fitted within U-shaped channels 37 thereon. At the opposite or distal end 35 of legs 18, a locking tab 42 is provided for engagement with a leg extension 40. Mast guide 19 further includes a center bore 20 for slidably receiving mast section 13 therethrough. Below mast guide 19 attached to legs 18 is brace assembly 21. Brace assembly 21 comprises mast support 22 which is cylindrically shaped and includes a central bore 23. As further seen in FIG. 2, mast section 13 is positioned in central bore 23 and is held therein by locking thumb screw 24. Locking thumb screw 24 is threadably received within mast support 22 and is tightenable against antenna mast section 13 to hold section 13 firmly within mast support 22. As would be understood, mast guide bore 20 and mast support bore 23 are in axial alignment and are slightly larger in diameter than the outer dimension of antenna mast section 13 whereby antenna mast section 13 can be easily slid therethrough as required. It has been found that mast section 13 can be conveniently formed from tubular steel having a one and one-quarter (1¼) inch outer diameter with a fourteen (14) gauge wall thickness, and of an alloy of sufficient structural integrity to maintain antenna mast 12 at a height of seventy-five (75) feet without bending with moderate wind speeds. Other wall thicknesses, metals and alloys may also be used depending on the particular circumstances required and desires of the user.

As further illustrated in FIG. 2, brace assembly arms 25 are hingedly attached at their outer ends to tripod legs 18 and are pivotally attached at their inner ends to mast support 22 to allow collapsing and opening of tripod 14. Wing nuts 26 are used to tighten brace assembly arms 25 at their respective correct pivotal positions during erection of tripod 14. Link chain 27 as also seen helps anchor mast support 22 and is affixed to one (1) leg 18 at one (1) end while the other end is affixed to mast support 22. Upon initial opening of tripod 14, mast support 22 will approximately axially align with mast guide 19 due to the selected length of chain 27.

As further shown in FIG. 2, antenna 11 (only partially shown in FIG. 2) is a conventional FM antenna for on site FM broadcasts of a relatively short range such as twenty-five to thirty-five (25-35) miles. Antenna 11 slips over tapered end 30 of mast section 13 and as shown in FIG. 4, end 30 may have an outer diameter of for example one (1) inch whereas body portion 31 of mast section 13 as shown in FIG. 4 may have an outer diameter of one and one-quarter (1¼) inches. The opposite or bottom end 32 of mast section 13 includes a locking tab 33 which comprises a portion of the outer tubular wall and has been folded inwardly, approximately perpendicularly and is three-eights (⅜) of an inch in length and one-quarter (¼) inch in width. Tab 33 engages L-shaped slot 34 in upper tapered end of mast section 13. Locking tab 33 and L-shaped slot 34 allow for the end-to-end connection of a plurality of mast sections 13 and said sections 13 can therefore be easily and securely engaged and disengaged as required. Mast section 13 as also shown in FIG. 2 includes collar 28 which is positioned proximate tapered end 30 of mast section 13. Thumb screw 29 allows collar 28 to be tightened on mast section 13 to prevent slipping through mast guide 19 during initial set up, before an additional mast section 13 is utilized or for a very short antenna mast.

During assembly and set up, once initial mast section 13 has been inserted in tripod 14 and antenna 11 attached, additional antenna mast sections 13 can be placed into the lower end of bore 23 while tab 33 of one (1) section 13 positioned within slot 34 of the last section 13, and antenna 11 is then raised by manually urging the lower mast section 13 upwardly. Once positioned as required, locking thumb screw 24 can be tightened against mast section body 31 and another mast section 13 is inserted, to continually, section by section raise antenna 11 to the desired height. With each mast section 13 being of a five (5) foot length, ten (10) such sections can be inserted through mast support bore 23 to raise the antenna to an approximate fifty (50) foot height. Likewise, tripod legs 18 can be extended by joining leg extensions 40 thereto. As shown in FIG. 2, leg extension 40 comprises a steel tubular member which may be also be for example five (5) feet in length and as seen in FIG. 5, includes an L-shaped slot 41. Tab 42 as shown in FIG. 6 engages slot 41 as previously discussed pertaining mast sections 13. As would be understood, the taller the antenna mast 12 becomes, the greater the base required for support and safety and accordingly, it has been found that for every three (3) mast sections 13 having a five (5) foot length which are used, one (1) additional leg extension 40 of five (5) foot length is required for tripod 14. Thus, for a stable antenna stand, having an initial antenna mast section and three (3) additional mast sections 13, providing a total antenna mast height of approximately twenty (20) feet, one (1) additional leg extension 40 would be required for each leg, providing a total antenna height of approximately twenty-four (24) feet, depending on the exact leg angle of the tripod configuration employed.

The illustrations and examples provided herein are for explanatory purposes and are not intended to limit the scope of the appended claims.

I claim:

1. A collapsible antenna stand for supporting an adjustable height antenna mast, the collapsible antenna stand comprising:
   (a) a tripod, said tripod comprising foldable legs, each of said legs having a lower, distal end for resting thereon;
   (b) a mast guide, said legs pivotally joined to said mast guide, said mast guide defining a first mast bore and a second mast bore, said second mast bore axially aligned with said first mast bore;
   (c) a mast section, said mast section slidably positioned within said first mast bore, said mast section for attaching an antenna thereto;
   (d) a brace assembly, said brace assembly comprising a mast support, said mast support attached to said legs below said mast guide and spaced from said lower, distal ends of said legs so that the distance between said mast support and each of said lower, distal ends of said legs is greater than the length of said mast section to allow mast sections to be inserted therein from beneath while said tripod is in a normal upright position resting on said leg lower, distal ends whereby mast sections can be inserted through said second mast bore into said first mast bore for engagement with other mast sections to provide a desired height antenna mast; and
   (e) a plurality of elongated brace assembly arms, one end of each of said arms pivotally joined to said mast support and the other end of each of said arms pivotally joined to one of said legs.

2. A collapsible antenna stand as claimed in claim 1 and including means to lock said mast section to said mast support, said locking means attached to said mast support.

3. A collapsible antenna stand as claimed in claim 1 wherein said mast section comprises a tapered end.

4. A collapsible antenna stand as claimed in claim 3 wherein said mast section comprises a locking tab, said locking tab positioned on the end of said mast section opposite said tapered end.

5. A collapsible antenna stand as claimed in claim 1 and including a brace guide, said brace guide attached to said brace assembly to maintain said brace assembly in position during tripod erection.

6. A collapsible antenna stand as claimed in claim 1 wherein said legs each comprise a leg locking tab, said leg locking tab positioned at said distal end.

7. A collapsible antenna stand as claimed in claim 1 and including a leg extension, said extension for inserting into said leg to frictionally engage said leg.

8. A collapsible antenna stand as claimed in claim 1 and including a plurality of mast sections, said sections joined one to another.

9. An antenna stand comprising:
   (a) a mast guide;
   (b) a leg, said leg attached to said mast guide, said leg having a lower distal end for resting thereon;
   (c) a mast support, said mast support spaced below said mast guide, said mast support attached to said leg, said mast support axially aligned with said mast guide along said leg;
   (d) a distance between said mast support and said lower distal end of said leg; and
   (e) an elongated mast section, said mast section for slidable reception by said mast guide and said mast support, the distance between said mast support and said lower, distal end of said leg being greater than the length of said mast section to allow said mast section to be inserted from below said mast support while said antenna stand is in an upright position.

10. An antenna stand as claimed in claim 9 and including a plurality of mast sections, said mast sections for cooperative engagement with one another.

11. A collapsible antenna stand for supporting an adjustable height antenna mast, the antenna stand comprising:
   (a) a tripod, said tripod comprising three legs, each of said legs having a lower distal end for resting thereon, the lowermost points of each of said three distal ends of said legs defining a spacial plane;
   (b) a mast guide, said legs joined to said mast guide;
   (c) a mast support, said mast support joined to said tripod, said mast support axially aligned with said mast guide; and
   (d) an elongated mast section, said mast section comprising an elongated tubular member slidably positionable through said mast support and said mast guide, said mast support spaced from said spacial plane such that the distance between said mast support and said spacial plane is greater than the length of said mast section, whereby said mast section can be inserted into said mast support from beneath and upward into said mast guide for engagement with a previously inserted mast section.

12. A collapsible antenna stand as claimed in claim 11 wherein said mast guide defines a first mast bore, said mast section slidably positionable within said first mast bore.

13. A collapsible antenna stand as claimed in claim 11 wherein said mast support defines a second mast bore, said mast section slidably positionable within said second mast bore.

14. A collapsible antenna stand as claimed in claim 11 wherein said mast section comprises a tapered end.

15. A collapsible antenna stand as claimed in claim 11 wherein said mast section comprises a tubular member, said tubular member comprising a tapered end, said tapered end defining a locking tab slot, an end opposite said tapered end, said opposite end comprising a locking tab.

16. A collapsible antenna stand as claimed in claim 11 and including a brace guide, said guide attached to one of said legs.

17. A collapsible antenna stand as claimed in claim 16 wherein said brace guide comprises a link chain.

18. A collapsible antenna stand as claimed in claim 11 wherein said mast support comprises means to lock said mast section therein.

19. A collapsible antenna stand as claimed in claim 18 wherein said locking means comprises a thumb screw.

20. A collapsible antenna stand as claimed in claim 11 and including a plurality of mast sections, each of said sections joined end to end, one to another.

* * * * *